United States Patent [19]

Kraus

[11] Patent Number: 5,020,749
[45] Date of Patent: Jun. 4, 1991

[54] BAND ELEMENT FOR BINDING AND HOLDING OF OBJECTS

[75] Inventor: Willibald Kraus, Grunstadt, Fed. Rep. of Germany

[73] Assignee: TRW United Carr GmbH & Co., Enkenbach-Alsenborn, Fed. Rep. of Germany

[21] Appl. No.: 437,186

[22] Filed: Nov. 16, 1989

[30] Foreign Application Priority Data

Oct. 5, 1989 [DE] Fed. Rep. of Germany ....... 3933304

[51] Int. Cl.⁵ ................................. F16L 3/08
[52] U.S. Cl. ................. 248/74.3; 24/16 PB; 248/71; 248/74.2
[58] Field of Search ............... 248/74.3, 74.2, 74.1, 248/73, 71, 65, 316.1; 24/16 PP, 17 AP

[56] References Cited

U.S. PATENT DOCUMENTS

| | | | |
|---|---|---|---|
| 3,429,985 | 2/1969 | Czigler | 24/16 PB X |
| 4,372,011 | 2/1983 | Aranyos | 24/20 TT |
| 4,802,646 | 2/1989 | Cattani | 248/74.2 X |
| 4,840,345 | 6/1989 | Neil et al. | 248/74.2 |

FOREIGN PATENT DOCUMENTS

| | | | |
|---|---|---|---|
| 2442414 | 3/1976 | Fed. Rep. of Germany | 248/74.3 |
| 2066887 | 7/1981 | United Kingdom | 248/74.3 |
| 2142376 | 1/1985 | United Kingdom | 248/74.2 |

*Primary Examiner*—Ramon O. Ramirez
*Attorney, Agent, or Firm*—Fay, Sharpe, Beall, Fagan, Minnich & McKee

[57] ABSTRACT

A band strap element for wrapping around and binding and holding an object, comprises a bearing zone 1 for the object to be held including a support part 2 and a strap-form binding element 3, with an engaging or gripping part 4, which can be joined detachably to a catch element 5. A fastening zone 6 joins the support zone 1 and serves for the fastening of the strip element to a support. The support part 2 is arched and is connected through a guide stay 7 with an outer shell 8. The outer shell 8 has an outer wall carrying the catch element 5, which is comprised of several saw-tooth profiles 9. The engaging element 4 is a catch projection 10 at the front end of the strap-form binding element 3. In the mounted condition, a partial zone of the binding part 3 is laid into the interspace 11 formed by the guide stay 7 which extends transversely between the support part 2 and the outer shell 8.

9 Claims, 1 Drawing Sheet

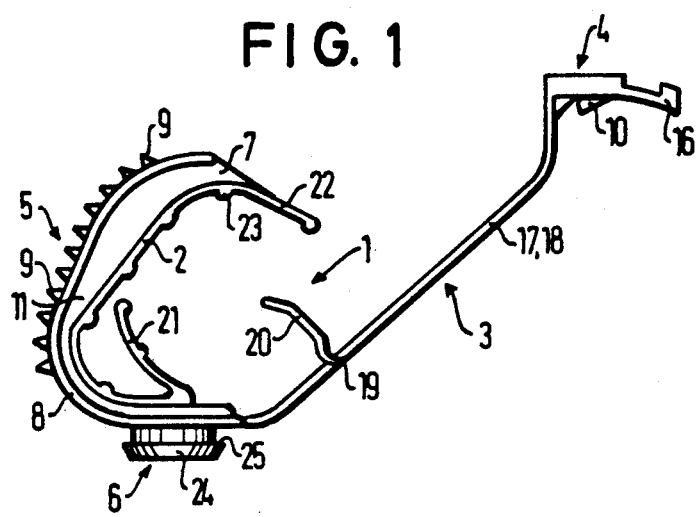
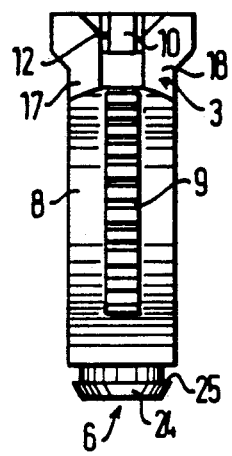
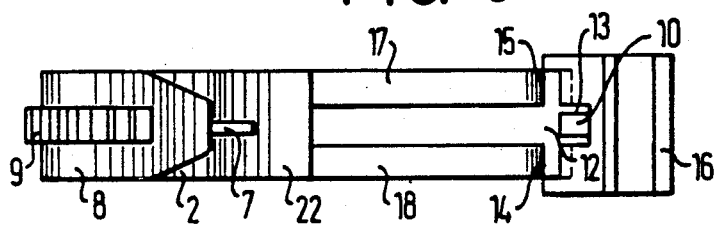
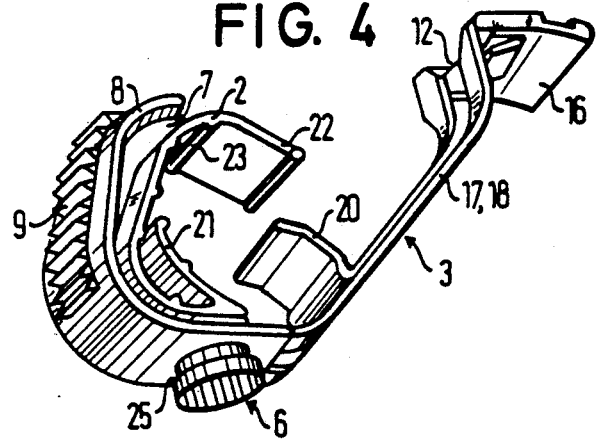
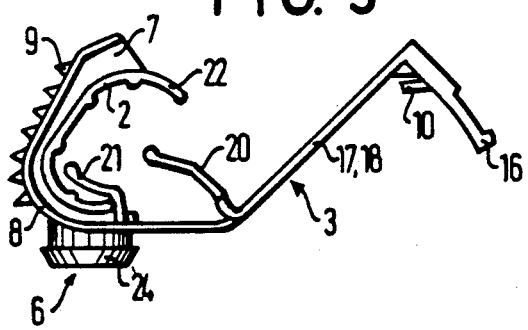
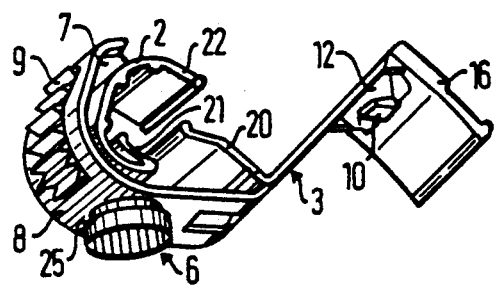

BAND ELEMENT FOR BINDING AND HOLDING OF OBJECTS

BACKGROUND OF THE INVENTION

The invention relates to a band strap element for the binding and holding of objects. The band strap element comprises a bearing zone for the object to be held which includes a support part and a strap-form binding part with at least one gripping and engaging element which can be detachably joined with at least one catch element. A fastening zone joins the bearing or base zone for fastening of the band strap element to a support.

In the current state of the art, there are known variously shaped band strap elements which are often used for the holding and binding together of elastic tubes, electric cables, and other parts which must be held together to form a unitary packet. For example, such elements are often needed in the field of electronic maintenance or the auto industry.

Also known in the prior art is a cable strap or band element comprised of a strip-form binding part having several stays and an arched neck with a catch element and a hookform gripping zone (see German Patent 2,813,484). This known cable strap is designed for a special range of sizes or diameters so that, for example, a various number of cables of smaller or greater diameter than the design range could not be properly held.

Other known cable straps are also designed only for special ranges of use and, therefore, do not function in a versatile or universal manner. (See U.S. Pat. No. 3,471,109; U.S. Pat. No. 3,930,287; and U.S. Pat. No. 3,486,200).

The present invention attacks the problem by providing a binding strap element of the kind mentioned, which is suitable for the functionally secure holding of pipes, tubes or cable of different diameters. It has a stable structure, as well as the advantage of easy mounting and demounting.

BRIEF DESCRIPTION OF THE INVENTION

This problem is solved, according to the invention, by the fact that the base part is at least partly arched or concave and is connected with an outer shell by a transverse guide stay passing therebetween. The outer shell has on its outer wall a catch element comprised of several saw-tooth profiles. The engaging element is a catch projection lying at the front end of the binding part; and, in the mounted condition, a partial zone of the binding part is laid into space formed by the guide passing between the base part and the outer shell.

Through the cooperation between the base part and the outer wall, in conjunction with the transverse guide stay passing therebetween, a stable binding element is provided. Through the saw-tooth profile and the catch projection, the binding element can be easily closed after laying in the different pipes or cables. By this overall combination, a stable and useful unit results.

In a further development of the invention, the transverse guide stay may be arranged in the middle between the base part and the outer shell. It is also possible for the saw-tooth profiles to be narrower than the width of the outer shell and to lie in the middle zone of the outer shell.

According to another feature of the invention, the front end of the binding part has an opening in the form of an inverted T-shape, in the middle zone of which the catch projection is arranged. The upper limit zone of the inverted T-shaped opening is laid, in the mounted condition, into the space between the base and outer shell. This provides a simple locking principle which in cooperation with the catch projection and the saw-tooth profiles, assures a perfect closing possibility in the mounted condition.

Above the inverted T-shaped opening of the binding part is arranged a gripping surface. While in this zone, the catch projection is directed obliquely toward the binding part. In this design, the binding part may have two parallel stays which are interrupted by a cross stay. In order to hold different pipelines or cables of different diameter perfectly in the bearing zone of the band strap element according to the invention, the base part, and/or the binding parts may have a resilient arm on the inside. The resilient arm on the inside surface of the binding part is preferably arranged in the zone of the cross stay for better stability.

To facilitate mounting, the outer shell may be shorter than the base part with the base part passing into a closing flange which is directed toward the inside of the binding part. Here, the base part may have transverse ridges on the inside to hold the mounted pipe or cable secure against being pushed or sliding axially along in the binding part.

For fastening the band strap element to a support, the fastening zone may be provided with a clip, glue or impact connection, so that various possibilities of fastening to a support are possible.

BRIEF DESCRIPTION OF THE DRAWINGS

The invention is described in detail below, from examples of execution shown in the drawing wherein:

FIG. 1 is a side view of a band strap element formed in accordance with the preferred embodiment and illustrated in opened condition;

FIG. 2 is a front view of the band strap element of FIG. 1;

FIG. 3 is a top view of the band strap element of FIG. 1;

FIG. 4 is a perspective view of the band strap element of FIG. 1;

FIG. 5 shows in sideview another embodiment of the band strap element of the invention in opened condition; and, FIG. 6 is a perspective view of the band strap element of FIG. 5, in opened condition.

DETAILED DESCRIPTION OF THE PREFERRED AND ALTERNATE EMBODIMENTS

Referring more particularly to the drawings wherein the showings are for the purpose of illustrating preferred and alternate embodiments of the invention only, and not for the purpose of limiting same, FIG. 1 shows the overall arrangement of a band strap element for binding and holding of objects which is comprised, in particular, of a bearing zone 1 for receiving the objects to be held and a base part 2 which is associated therewith and which is at least partly concave. A band strap form binding part 3 is indirectly joined to the base part 2 through an outer shell (8) and guide stay (11) (as subsequently described). The part (3) has at least one engaging element 4 which can be connected detachably with at least one catch element 5. The band element also has a fastening zone 6 which joins the bearing zone 1 for fastening the band strap element to a support frame or panel (not shown).

The base part 2 of the bearing zone 1, is connected through a transversely extending guide stay 7 with an outer shell 8. The outer wall surface of the shell 8 carries the catch element 5. As illustrated, the catch element 5 is comprised of a spaced series of several saw-tooth profiles.

The engaging element 4 comprises a catch projection 10 carried at the front end of the binding part 3. As shown in FIG. 1, catch projection 10 is directed, preferably obliquely, toward the binding part 3. This catch projection 10 is in the middle zone 13 of an opening having an inverted T-shape 12 at the front end of the binding part 3, as shown in FIG. 3. The upper limit zones 14 and 15 of the inverted T-shaped opening connect with two parallel running stays 17 and 18.

In closing the band element, the stays 17 and 18 are laid on both sides of the guide stay 7 and pass through between the outer shell 8 and the base part 2, into the corresponding space 11. The catch projection 10 engages in one of the saw-tooth profiles 9, and with this, the closing process is ended. For carrying out this mounting process, the front end of the binding part 3 is advantageously provided with a gripping handle 16 which extends above the inverted T-shaped opening 12 as illustrated in FIG. 3.

The base part 2 and/or the binding part 3 may have on their inside surfaces at least one resilient arm 20 and 21, respectively. These resilient arms serve to assist in holding pipes of different diameters in the bearing zone 1 of the strip elements. In the preferred arrangement, the resilient arm 20 in the zone of the binding part 3 is located above a cross stay 19 which joins two parallel stays 17 and 18.

The base 2 may have transverse ridges 23 on the inside which, in cooperation with the resilient arms 20 and 21, produce a more secure holding of the cable or pipe in the bearing zone 1.

As can be seen from FIG. 3, the transverse guide stay 7 is preferably located in the middle between the base part 2 and the outer shell 8. The saw-tooth profiles 9 are preferably, as shown in FIGS. 2 and 3, narrower than the width of the outer shell 8 and generally sized according to the width of the catch projections 10. As shown, the sawtooth profiles 9 are preferably located in the middle zone of the outer shell 8.

From FIGS. 1 and 3 it can be seen that the outer shell 8 is shorter in length than the base part 2. In particular, the base part 2 passes into a closing flange 22, directed toward the inside of the binding part 3. This closing flange 22 is elastically resilient, and preferably narrows the bearing zone 1, so that the pipe or cable to be held can be better gripped. In the closed condition, the inner side of the binding part 3 lies adjacent the two resilient stays 17 and 18 against the surface of the closing flange 22.

As can be seen from FIG. 1, the base part 2 and the outer shell 8 run generally parallel in the lower zone, while in the upper zone the space 11 widens conically. That is, the base part 2 and the outer shell 8 diverge relative to each other approximately up to the front end. At the front end the intermediate guide stay 7 passes obliquely into the closing flange 22.

In the embodiment according to FIGS. 5 and 6, resilient arms 20 and 21 are also used, but in this embodiment the arms are shaped differently than in FIG. 1. In this embodiment there is also a catch projection 10 which cooperates with the saw-tooth profiles 9 of the catch element 5 located on the upper side of the outer shell 8. Here also, there is a transverse guide stay 7 which, in the front zone, passes into the closing flange 22. In this embodiment, the front end of the binding part 3 is likewise provided with an opening 12, in the form of an inverted T-shape. However, here the binding part 3 runs in a straight line, as in FIG. 5, and at the front end passes, approximately perpendicular thereto; into the gripping handle 16. Contrary to this, in the example according to FIGS. 1 to 4, the binding part 3 is angled in the front zone and both the handle 16 and the inverted T-shaped opening are in this angled zone.

In the example of FIGS. 5 and 6, there are also stays 17 and 18, which run parallel and which form the binding part 3.

Through the construction according to the invention, a band strap element is provided which is built very stable and which can perfectly hold pipe or cable of different diameter.

The fastening zone 6 of this band strap element may be provided, for example, with a clip, glue or an impact joining element 24. In the embodiments according to FIGS. 1 and 5, the fastening zone 6 consists of a cylindrical body with surrounding rims, while parallel ridges are arranged to run vertically inside. This fastening zone may be clipped to an intermediate element, which grips by projections lying opposite each other into the rims 25 of the fastening zone 6.

What is claimed is:

1. In a band strap element for the binding and holding of objects to a support comprising a bearing portion for the objects to be held, said bearing portion including a base part and a band-form binding part having a free end and at least one engaging element which can be detachably connected with at least one catch element, and with fastening zone adjoining the bearing zone for fastening the band strap element to a support, the improvement wherein the base part (2) is at least partially concave and is connected through at least one transverse guide stay (7) with an outer shell (8) having on an outer wall surface thereof a catch element comprised of several saw-tooth profiles (9); and engaging element (4) including a catch projection (10) formed at the free end of the bonding part (3); and wherein in the mounted condition a portion of the binding part (3) is received into a space (11) between the base part (2) and the outer shell (8); and, further, wherein the free end of the bonding part (3) has an opening (12) with an inverted T-shape in the middle zone (13) of which the catch projection (10) is arranged, the upper limit zones (14, 15) of the inverted T-shaped opening (12) in the mounted condition being received into the space (11) between the base part (2) and the outer shell (8).

2. A band strap element according to claim 1 wherein a handle (16) is located adjacent the inverted T-shaped opening (12) of the band part (3).

3. A band strap element according to claim 1 wherein the catch projection (10) is directed obliquely toward the binding part (3).

4. In a band strap element for the binding and holding of objects to a support comprising a bearing portion for the objects to be held, said bearing portion including a base part and a band-form binding part having a free end and at least one engaging element which can be detachably connected with at least one catch element, and with a fastening zone adjoining the bearing zone for fastening the band strap element to a support, the improvement wherein the base part (2) is at least partially concave and is connected through at least one transverse guide stay (7) with an outer shell (8) having on an outer wall surface thereof a catch element comprised of several saw-tooth profiles (9); and engaging element (4) including a catch projection (10) formed at the free end of the bonding part (3); and wherein in the mounted condition a portion of the binding part (3) is received into a space (11) between the base part (2) and the outer shell (8); and, further, wherein the binding part (3) has two parallel stays (17, 18).

5. A band strap element according to claim 4 wherein the stays (17, 19) are interrupted by a cross stay (19).

6. In a band strap element for the binding and holding of objects to a support comprising a bearing portion for the objects to be held, said bearing portion including a base part and a band-form binding part having a free end and at least one engaging element which can be detachably connected with at least one catch element, and with a fastening zone adjoining the bearing zone for fastening the band strap element to a support, the improvement wherein the base part (2) is at least partially concave and is connected through at least one transverse guide stay (7) with an outer shell (8) having on an outer wall surface thereof a catch element comprised of several saw-tooth profiles (9); and engaging element (4) including a catch projection (1) formed at the free end of the bonding part (3); and wherein in the mounted condition a portion of the binding part (3) is received into a space (11) between the base part (2) an the outer shell (8); and, further, wherein one of the base part (2) of the binding part (3) has at least one resilient arm (20, 21) carried thereon.

7. A band strap element according to claim 6 wherein the resilient arm (20) is arranged on the inner side of the binding part (3) in the zone of the cross stay (19).

8. In a band strap element for the binding and holding of objects to a support comprising a bearing portion for the objects to be held, said bearing portion including a base part and a band-form binding part having a free end and at least one engaging element which can be detachably connected with at least one catch element, and with a fastening zone adjoining the bearing zone for the fastening the band strap element to a support, the improvement wherein the base part (2) is at least partially concave and is connected though at least one transverse guide stay (7) with an outer shell (8) having on an outer wall surface thereof a catch element comprised of several saw-tooth profiles (8); and engaging element (4) including a catch projection (10) formed at the free end of the bonding part (3); and wherein in the mounted condition a portion of the binding part (3) is received into a space (11) between the base part (2) and the outer shell (8); and, further, wherein the outer shell (8) is shorter than the base part (2) and the base part (2) passes into a closing flange (22) directed toward the inner side of the binding part (3).

9. A band strap element according to claim 8 wherein the base part (2) has transverse ridges (23) on the inner side.

* * * * *